B. McCARTY.
WATCH AND JEWELRY CLEANER.
APPLICATION FILED SEPT. 24, 1920.
1,426,400.
Patented Aug. 22, 1922.
3 SHEETS—SHEET 3.
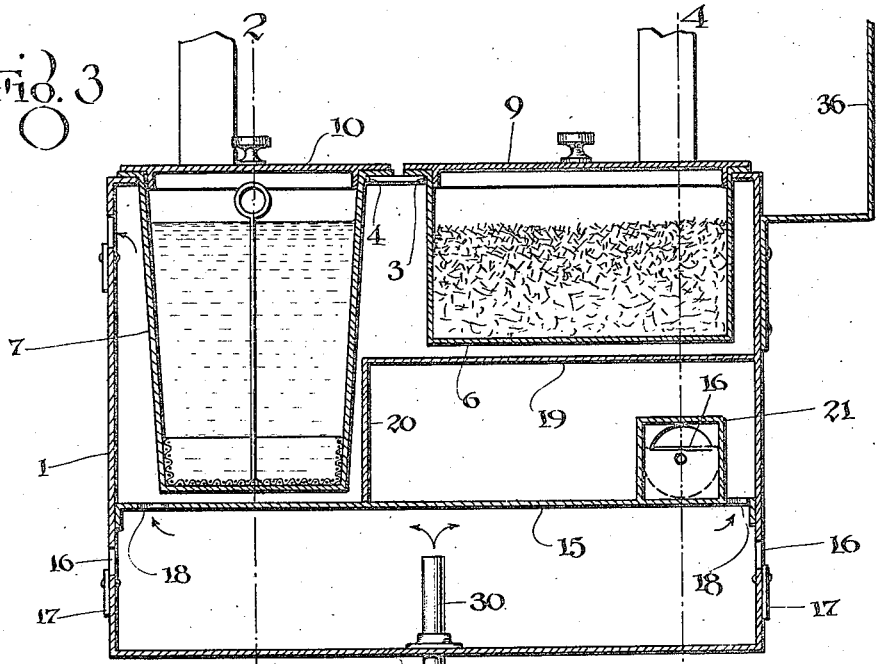
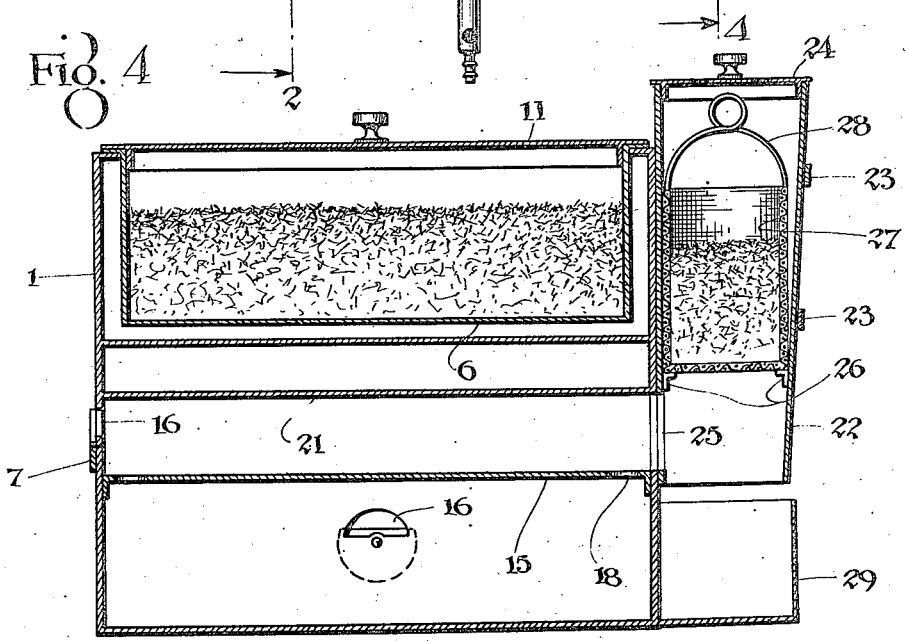
WITNESSES
INVENTOR
B. McCarty.
BY
ATTORNEYS

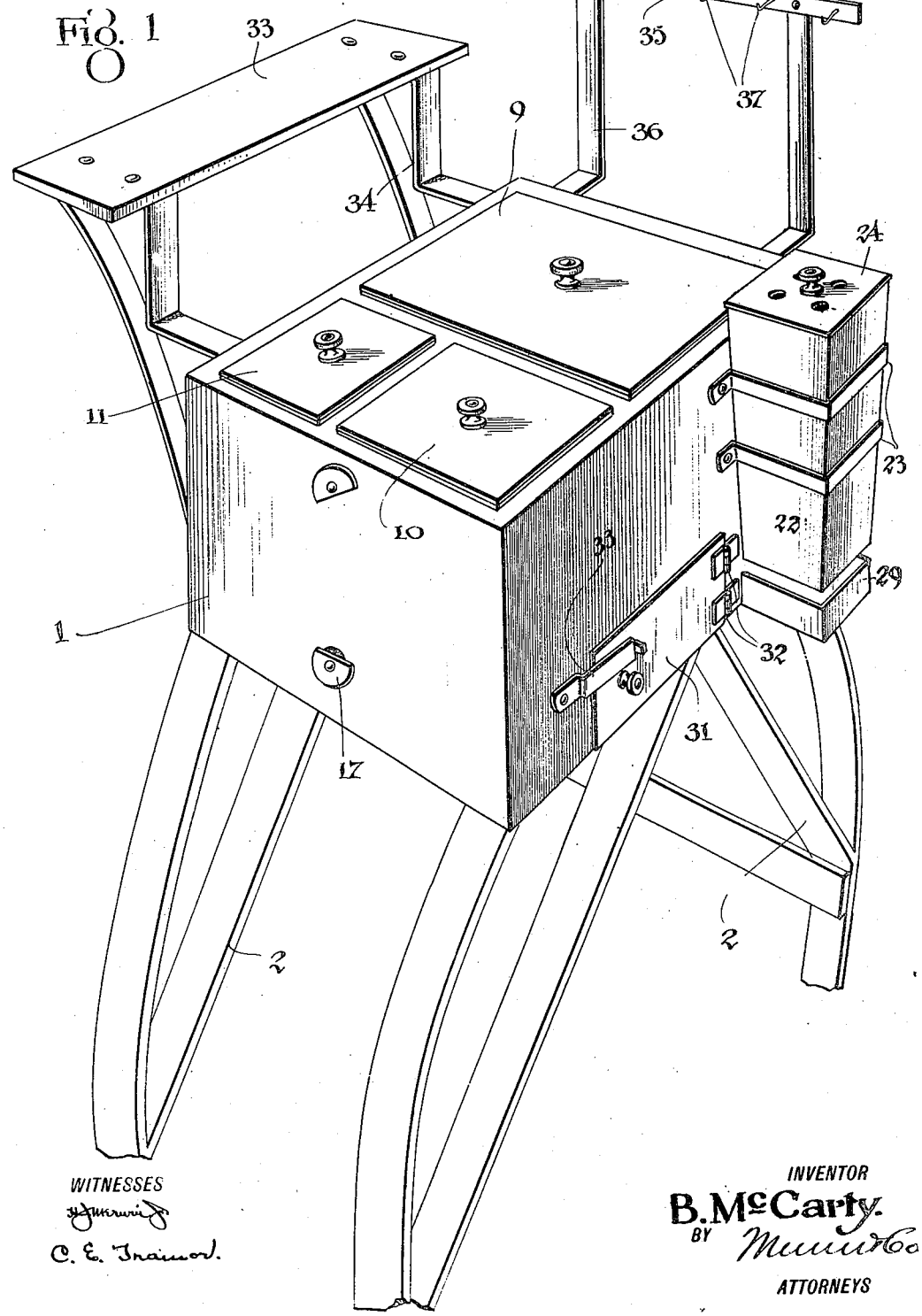

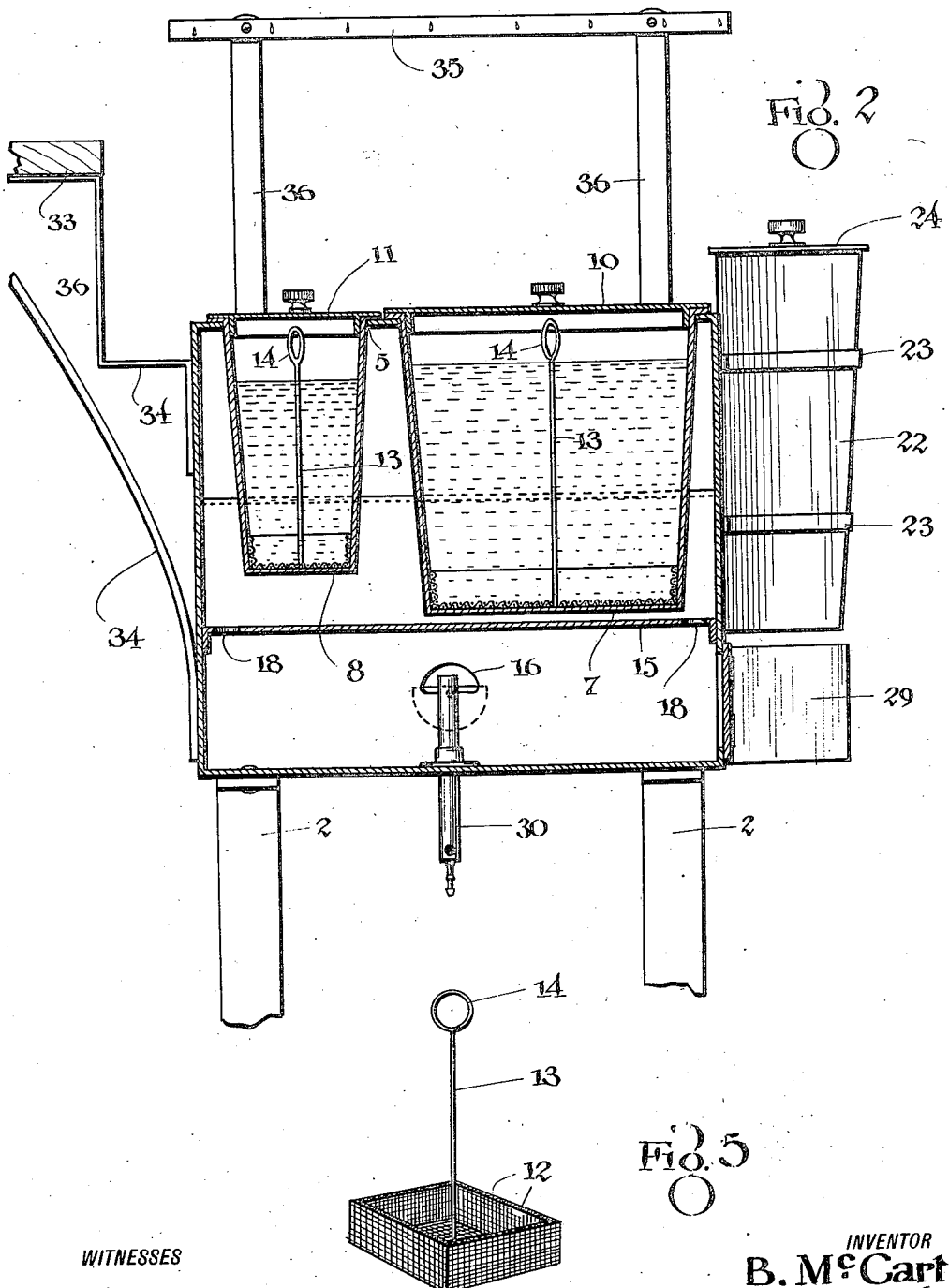

UNITED STATES PATENT OFFICE.

BERT McCARTY, OF TAMPA, FLORIDA.

WATCH AND JEWELRY CLEANER.

1,426,400. Specification of Letters Patent. Patented Aug. 22, 1922.

Application filed September 24, 1920. Serial No. 412,579.

*To all whom it may concern:*

Be it known that I, BERT McCARTY, a citizen of the United States, and a resident of Tampa, in the county of Hillsborough and State of Florida, have invented certain new and useful Improvements in Watch and Jewelry Cleaners, of which the following is a specification.

My invention is an improvement in watch and jewelry cleaners, and has for its object to provide a simple, inexpensive and easily operated device of the character specified, by means of which the disassembled watch movements may be thoroughly cleaned in a very short time, and with a minimum of labor.

In the drawings:—

Figure 1 is a perspective view of the improved cleaner,

Figures 2 and 4 are sections on the lines 2—2 and 4—4 respectively of Figure 3.

Figure 3 is a longitudinal vertical section,

Figure 5 is a perspective view of one of the reclaiming baskets.

In the present embodiment of the invention, a suitable casing 1 is provided of sheet metal of suitable gage, the said casing being supported by legs 2, and this casing has in the top thereof three holes or openings 3, 4 and 5. Within these openings, there is arranged a series of receptacles 6, 7 and 8, each receptacle having a flange at its upper edge which seats about the edge of the opening to limit the downward movement of the receptacle, and the receptacles have covers 9, 10 and 11, each of which has a handle for lifting the same.

The receptacle 6 is adapted to contain saw-dust, the receptacle 7 hot water, and the receptacle 8 a cleaning solution. The saw dust should be fine, clean box-wood sawdust, and the cleaning solution may be of any desired character. In each of the receptacles 7 and 8 there is arranged a reclaiming basket of the character shown in Figure 5.

Each of these baskets is of perforate material, being an open top container, and each basket is provided at its center with an upstanding rod 13 having a ring 14 at its top forming a handle for permitting the basket to be removed from the receptacle.

Referring to Figure 2, it will be noticed that the receptacles 7 and 8 taper toward their bottoms slightly, and the body of the basket is shaped to fit so that the side walls of the basket fit closely against the side walls of the receptacle. The handles 13—14 are of a length to extend well above the solution in the receptacle.

A partition 15 is arranged transversely of the casing 1 about one-third the depth of the receptacle from the bottom, and this partition forms between the same and the bottom of the casing a heating chamber. The chamber has draft openings 16 which may be closed by dampers 17, the said dampers being pivoted to the casing walls.

Referring to Figures 2 and 4, it will be noticed that these openings 16 are segmental or semi-circular, as are also the dampers. A third opening 16 is provided in another wall, the said opening having a damper 17. The partition 15 has openings 18 at its corners for permitting the heated air to pass upwardly. The openings 18 in the partition also establish communication between the conduit 21 and the heating chamber in the lower part of the casing. A partition 19 is arranged above the rear end of the partition 15, the said partition 19 extending approximately two-thirds the length of the casing 1 from the rear thereof, and a vertical partition 20 connects the front edge of this horizontal partition 19 with the partition 15, forming another compartment between the heating chamber and that portion of the casing which receives the receptacles 6, 7 and 8. As illustrated in Figure 3, the partitions 19 and 20 define an intermediate chamber between the saw-dust receptacle and the heating chamber having the heating element 18. By reason of this arrangement the saw-dust within the receptacle 6 is prevented from being over heated and possibly catching fire.

Within the chamber formed by the partitions 15, 19 and 20, a conduit 21 is arranged, the said casing extending transversely of the casing 1, the full width thereof, and one of the openings 16 is at one end of the said conduit. That end of the conduit remote from the damper opening 16 opens through the end of the casing 1, and at this end of the casing 1 there is arranged a casing 22 forming a drying chamber. This casing 22 tapers toward its bottom, and is held against the end of the casing 1 by means of substantially U-shaped clips 23 within which the casing 22 is seated, and the said casing has a cover 24 which is provided with a handle, and with openings for permitting the escape of heated air.

The bottom of the casing 22 is open, as shown in Figure 4, and it has a lateral opening 25 which registers with the end of the conduit 21 when the casing 22 is in place in the clips 23. This casing 22 has stops 26 extending transversely of opposite faces thereof, and upon the stops there seats a perforate basket 27 having a handle 28.

The casing 1 is provided with an open top extension 29 at a point directly below the chamber 22, which will receive any saw-dust that might pass through the perforate receptacle 27, the said receptacle being adapted to contain saw-dust.

A heating element 30 of any desirable construction is arranged within the heating chamber below the partition 15. This heating element in the present instance is a gas heater which may be connected with any suitable source of supply. A door 31 is provided at the side of the casing, and at the heating chamber, the said door being hinged to the casing as indicated at 32 and having a latch for holding it closed. At one side of the casing a shelf 33 is supported, by means of brackets 34, the said shelf being at a higher level than the level of the top of the casing. At the rear end a bar 35 is arranged, the said bar being supported by angle brackets 36 at a higher level than the shelf 33, and both shelf and bar are offset outwardly away from the casing.

The improved cleaner is used as follows. A sufficient degree of heat being attained in the casing, the receptacle 7 being filled with clean water, the receptacle 8 with a cleaning solution, and the receptacle 6 with dry fine box-wood saw-dust, a little over half full, the device is ready for operation. Upon the shelf 33 there is arranged a receptacle containing a solution of cyanide, two receptacles containing alcohol, and on the bar 35 which is provided with a series of hooks 37, there is arranged a number of hooks, and about four factory style watch brushes of different grades. The watch movement is first completely disassembled, and all of the parts, as for instance, screws, clicks, springs and the like, with the exception of the balance and the fork, are placed in the hydro-chemical cleaner.

Then the larger parts are strung on such hooks as are suitable to hold them, the parts now are first immersed in gasoline about thirty seconds. Then they are dipped into the cleaning solution for a few seconds, receptacle 8, then in running water, and if badly tarnished into the cyanide solution. Now they are again washed in running water, then dipped in the receptacle 8, and then brushed, the parts being rubbed with a circular motion for a few seconds.

The parts are again dipped in running water, again into the hot water in the receptacle 7, then into the first cup of alcohol, then in the second cup, and then into the saw-dust receptacle 6. After moving the articles around a few times in the saw-dust, they are left there for a moment. The small articles which have been in the cleaning solution and the receptacle 8 are now removed from the receptacle and put through the same course of operation as the larger articles. The contents of the saw-dust receptacle 6 are now emptied into the basket 27. Now by a few quick motions of the basket 27, which is cylindrical and may rotate in the casing 22, the saw-dust is sifted through the bottom of the basket into the receptacle 29, leaving the articles clean and dry in the basket. The balance and fork are cleaned in the same way, only they must not remain any length of time in the solution, otherwise the shellac will melt from the stone.

I claim:—

1. An apparatus for use in cleaning jewelry comprising a casing having a horizontal partition defining upper and lower chambers, receptacles for cleaning mediums received in said upper chamber and having closures arranged above said casing, a heating member in said lower chamber, and a second partition engaging said first named partition and one side of said casing thereby defining an intermediate chamber beneath one of said receptacles, said first named partition having openings establishing communication between said lower and intermediate chambers.

2. An apparatus for use in cleaning jewelry comprising a casing having a horizontal partition defining upper and lower chambers, receptacles for cleaning mediums received in said upper chamber and having closures arranged above said casing, a heating member in said lower chamber, a second partition engaging said first named partition and one side of said casing thereby defining an intermediate chamber beneath one of said receptacles, said first named partition having openings establishing communication between said lower and intermediate chambers, and a conduit extending through said intermediate chamber.

3. An apparatus for use in cleaning jewelry comprising a casing having a horizontal partition defining upper and lower chambers, receptacles for cleaning mediums received in said upper chamber and having closures arranged above said casing, a heating member in said lower chamber, a second partition engaging said first named partition and one side of said casing thereby defining an intermediate chamber beneath one of said receptacles, said first named partition having openings establishing communication between said lower and intermediate chambers, a conduit extending through said intermediate chamber, and a jewelry container having communication with said conduit and carried by said casing.

BERT McCARTY.